US011699315B2

(12) United States Patent
Cun et al.

(10) Patent No.: US 11,699,315 B2
(45) Date of Patent: Jul. 11, 2023

(54) SYSTEM AND METHOD FOR LOCKING A CHARGING PORT TO CHARGE AN ELECTRIC VEHICLE

(71) Applicant: Honda Motor Co., Ltd., Tokyo (JP)

(72) Inventors: David Wong Cun, Fountain Valley, CA (US); Ryan Douglas Roy Harty, Long Beach, CA (US); Satoru Shinzaki, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/857,592

(22) Filed: Jul. 5, 2022

(65) Prior Publication Data
US 2022/0335761 A1    Oct. 20, 2022

Related U.S. Application Data

(63) Continuation of application No. 17/074,858, filed on Oct. 20, 2020, now Pat. No. 11,462,066.

(51) Int. Cl.
*G07C 9/00* (2020.01)
*B60L 53/16* (2019.01)
(Continued)

(52) U.S. Cl.
CPC .......... *G07C 9/00896* (2013.01); *B60L 53/16* (2019.02); *B60L 53/66* (2019.02); *E05B 65/00* (2013.01); *G01S 19/01* (2013.01); *G06F 16/24* (2019.01); *G06Q 40/12* (2013.12); *G06Q 50/06* (2013.01); *H04L 67/52* (2022.05);
(Continued)

(58) Field of Classification Search
CPC ..... G07C 9/00896; B60L 53/16; B60L 53/66; E05B 65/00; H04L 67/52; B60Y 2200/91; B60Y 2200/92; B60Y 2300/91
See application file for complete search history.

(56) References Cited

U.S. PATENT DOCUMENTS 8,025,526 B1   9/2011   Tormey et al.
8,075,329 B1   12/2011  Janarthanam et al.
(Continued)

FOREIGN PATENT DOCUMENTS

CN    201352590    11/2009
JP    2007236172   9/2007
JP    5480754      4/2014

*Primary Examiner* — A. Hunter Wilder
(74) *Attorney, Agent, or Firm* — Rankin, Hill & Clark LLP

(57) ABSTRACT

A system and method for locking a charging port to charge an electric vehicle that includes determining that the electric vehicle is located within a predetermined distance of a charging station and determining that the charging station issues parking citations associated with parking of the electric vehicle at the charging station without attachment of the charging port to the electric vehicle. The system and method also include determining charging of the electric vehicle and sending a command to enable a locking mechanism of the charging port to lock the charging port in place. The system and method further include completing user authentication with respect to an operator of the electric vehicle to disable the locking mechanism to ensure that the charging port is not detached by an unauthorized individual and that parking citations are not issued based on the parking of the electric vehicle at the charging station.

18 Claims, 5 Drawing Sheets

(51) Int. Cl.

| | | |
|---|---|---|
| *B60L 53/66* | (2019.01) | |
| *E05B 65/00* | (2006.01) | |
| *G06F 16/24* | (2019.01) | |
| *G06Q 40/12* | (2023.01) | |
| *G01S 19/01* | (2010.01) | |
| *G06Q 50/06* | (2012.01) | |
| *H04L 67/52* | (2022.01) | |
| *B60K 6/28* | (2007.10) | |

(52) U.S. Cl.
CPC ............ *B60K 6/28* (2013.01); *B60Y 2200/91* (2013.01); *B60Y 2200/92* (2013.01); *B60Y 2300/91* (2013.01)

(56) References Cited

U.S. PATENT DOCUMENTS

| | | |
|---|---|---|
| 8,262,402 B2 | 9/2012 | Gaul et al. |
| 8,357,001 B2 | 1/2013 | Katagiri et al. |
| 8,523,589 B2 | 9/2013 | Kurumizawa et al. |
| 8,816,815 B2 | 8/2014 | Kuramochi et al. |
| 8,976,016 B2 | 3/2015 | Oury et al. |
| 9,168,822 B2 | 10/2015 | Ichikawa et al. |
| 9,216,656 B2 | 12/2015 | Nakajima |
| 9,331,425 B2 | 5/2016 | Fuehrer et al. |
| 9,350,118 B2 | 5/2016 | Nakajima |
| 9,423,937 B2 | 8/2016 | Penilla et al. |
| 9,495,819 B2 | 11/2016 | Morita |
| 9,895,987 B2 | 2/2018 | Uchiyama et al. |
| 10,328,809 B2 | 6/2019 | Masuda |
| 2011/0213656 A1 | 9/2011 | Turner |
| 2012/0022685 A1* | 1/2012 | Miller .................... B60L 53/14 700/232 |
| 2012/0048983 A1 | 3/2012 | Bianco et al. |
| 2013/0346166 A1* | 12/2013 | Chihara .................. B60L 53/65 705/13 |
| 2014/0236379 A1 | 8/2014 | Masuda et al. |
| 2015/0224888 A1 | 8/2015 | Wild et al. |
| 2019/0066416 A1 | 2/2019 | Dhillon et al. |
| 2021/0402890 A1* | 12/2021 | Hou ..................... B60L 53/305 |

* cited by examiner

SYSTEM AND METHOD FOR LOCKING A CHARGING PORT TO CHARGE AN ELECTRIC VEHICLE

CROSS-REFERENCE TO RELATED DISCLOSURE

This disclosure is a continuation of, and claims priority to, U.S. application Ser. No. 17/074,858 filed on Oct. 20, 2020 and is now published as U.S. Publication No. 2022/0122394 which is expressly incorporated herein by reference.

BACKGROUND

Electric vehicles may contain electric storage mechanisms (e.g., electric engines powered by rechargeable batteries) to store electricity and power the electric vehicles. The electric storage mechanisms may be replenished periodically by using, for example, charging equipment installed at a residential home or charging equipment installed at public charging stations. Based on a demand of consumers to charge their respective electric vehicles at the charging stations, at one or more points in time, there may be a queue of electric vehicles that may be waiting to be charged. To avoid having charging bays that include unutilized charging ports, some charging stations have implemented citations that may be issued to owners/operator of electric vehicles that are parked at the respective charging bays without active utilization of the charging port to charge the respective electric vehicles.

In some circumstances, as electric vehicles are being actively charged, a user may remove the charging port from an actively charging electric vehicle to attach to another electric vehicle. In such cases, charging stations that implement citations may issue a citation to the electric vehicle for which the charging port was removed. This may cause unnecessary and unjust issuance of citations through no fault of the owner/operator of the electric vehicle from which the charging port was removed.

BRIEF DESCRIPTION

According to one aspect, a computer-implemented method for locking a charging port to charge an electric vehicle is provided. The method may include determining that the electric vehicle is located within a predetermined distance of a charging station and determining that the charging station issues parking citations associated with parking of the electric vehicle at the charging station without attachment of the charging port to the electric vehicle. The computer-implemented method may also determine charging of the electric vehicle and sending a command to an electric vehicle supply equipment (EVSE) of the charging station to enable a locking mechanism of the charging port to lock the charging port in place to ensure continued attachment of the charging port to the electric vehicle. The computer-implemented method may further include completing user authentication with respect to an operator of the electric vehicle to disable the locking mechanism and allow detachment of the charging port from the electric vehicle to ensure that the charging port is not detached by an unauthorized individual and that parking citations are not issued to the operator of the electric vehicle by the charging station.

According to another aspect, a system for locking a charging port to charge an electric vehicle that includes a memory storing instructions is provided. The instructions when executed by a processor may cause the processor to determine that the electric vehicle is located within a predetermined distance of a charging station and determine that the charging station issues parking citations associated with parking of the electric vehicle at the charging station without attachment of the charging port to the electric vehicle. The instructions may also cause the processor to determine charging of the electric vehicle and send a command to an electric vehicle supply equipment (EVSE) of the charging station to enable a locking mechanism of the charging port to lock the charging port in place to ensure continued attachment of the charging port to the electric vehicle. The instructions may further cause the processor to complete user authentication with respect to an operator of the electric vehicle to disable the locking mechanism and allow detachment of the charging port from the electric vehicle to ensure that the charging port is not detached by an unauthorized individual and that parking citations are not issued to the operator of the electric vehicle by the charging station.

According to yet another aspect, a non-transitory computer readable storage medium storing instructions is provided. The instructions, when executed by a computer, which includes a processor, may perform a method that includes determining that the electric vehicle is located within a predetermined distance of a charging station and determining that the charging station issues parking citations associated with parking of the electric vehicle at the charging station without attachment of a charging port to the electric vehicle. The method may also include determining charging of the electric vehicle and sending a command to an electric vehicle supply equipment (EVSE) of the charging station to enable a locking mechanism of the charging port to lock the charging port in place to ensure continued attachment of the charging port to the electric vehicle. The method may further include completing user authentication with respect to an operator of the electric vehicle to disable the locking mechanism and allow detachment of the charging port from the electric vehicle to ensure that the charging port is not detached by an unauthorized individual and that parking citations are not issued to the operator of the electric vehicle by the charging station.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
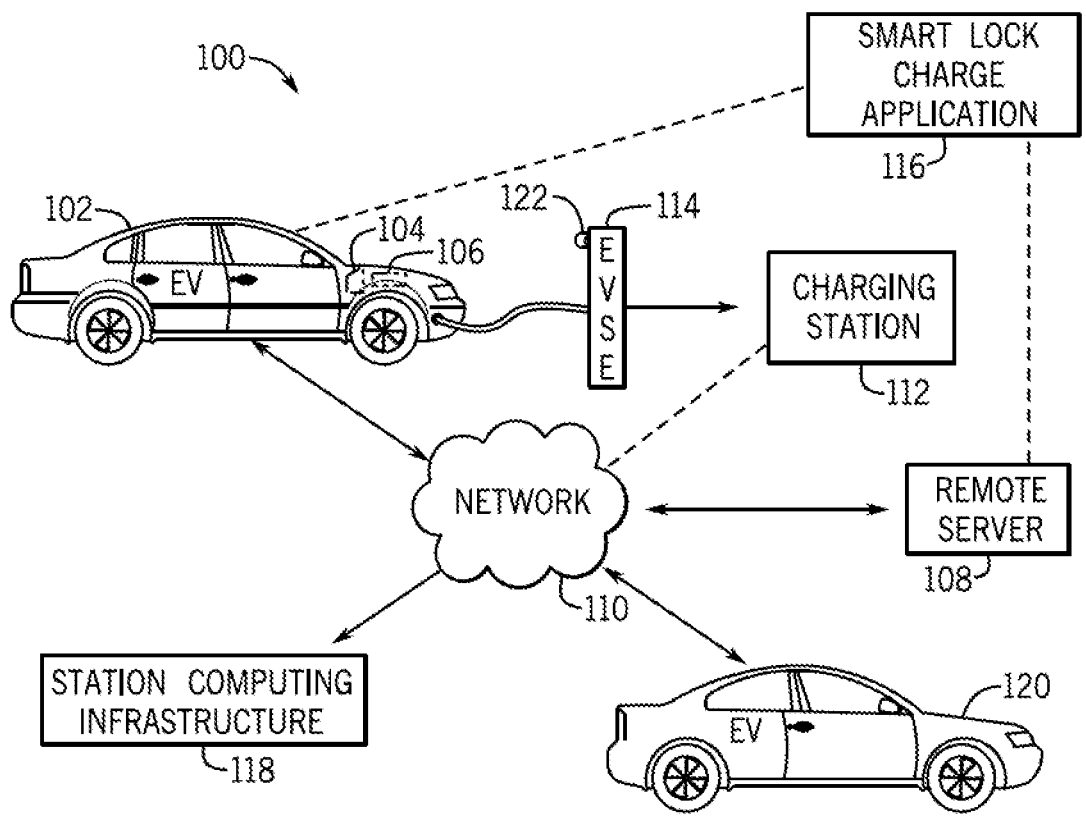
FIG. 1 is a high-level schematic view of an illustrative system for locking a charging port to charge an electric vehicle (EV) according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "computer-readable medium", as used herein, refers to a medium that provides signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device may read.

A "data store", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device. The data store can also refer to a database, for example, a table, a set of tables, a set of data stores (e.g., a disk, a memory, a table, a file, a list, a queue, a heap, a register) and methods for accessing and/or manipulating those data in those tables and data stores. The data store can reside in one logical and/or physical entity and/or may be distributed between two or more logical and/or physical entities.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, key fobs, handheld devices, mobile devices, smart phones, laptops, tablets and e-readers.

An "electric vehicle" (EV), as used herein, refers to any moving vehicle that is capable of carrying one or more human occupants and is powered entirely or partially by one or more electric motors powered by an electric battery. The EV may include battery electric vehicles (BEVs), plug-in hybrid electric vehicles (PHEVs) and extended range electric vehicles (EREVs). The term "vehicle" includes, but is not limited to: cars, trucks, vans, minivans, SUVs, motorcycles, scooters, boats, personal watercraft, and aircraft.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview:

Referring now to the drawings, wherein the showings are for purposes of illustrating one or more exemplary embodiments and not for purposes of limiting the same, FIG. 1 is a high-level schematic view of an illustrative system 100 for locking a charging port to charge an electric vehicle (EV) 102 according to an exemplary embodiment of the present disclosure. The components of the system 100, as well as the components of other systems and architectures discussed herein, may be combined, omitted or organized into different architectures for various embodiments.

In an exemplary embodiment, the EV 102 is powered by an electric motor 104 and an electric storage mechanism, for example, a battery 106. In one embodiment, the EV 102 is purely electric in that it only has the electric motor 104. Multiple electric motors may exist within the EV 102. In other embodiments, the EV 102 may have the electric motor 104 and an internal combustion engine (not shown). In some embodiments, the EV 102 may have any number of electric motors, batteries, and/or internal combustion engines and they may operate in series (e.g., as in an extended range electric vehicle), in parallel, or some combination of series and parallel operation.

The EV 102 may be operably connected for computer communication to a remote server 108 via a wireless communication network 110. The EV 102 may transmit and receive data (e.g., location data, state of charge data, charging commands/signals, real-time charging status) to and from the remote server 108, and vice versa, through the network 110. The remote server 108 may be a remote computing system or an electronic device that is remotely located (e.g., off-board) from the EV 102. The system architectures of the EV 102 and the remote server 108 will be discussed in more detail herein with reference to FIG. 2 and FIG. 3.

In the exemplary embodiment of FIG. 1, the system 100 may include one or more charging stations 112. Each of the one or more charging stations 112 may include one or more charging bays (not shown) (e.g., covered parking bay, designated parking location) at which the EV 102 may be parked to utilize an electric vehicle supply equipment (EVSE) 114 to charge the EV 102 as the EV 102 is parked within the charging bay.

Figure 2:
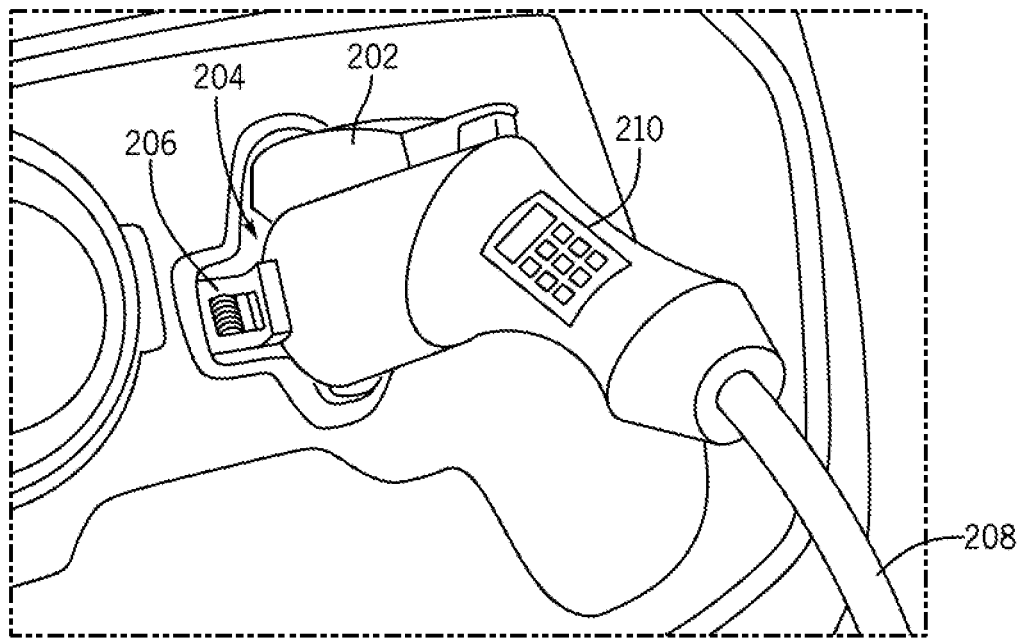
FIG. 2 is an illustration of an exemplary charging port that is connected to a charging link that connects from an electric vehicle supply equipment (EVSE) to a charging inlet of the EV according to an exemplary embodiment of the present disclosure.

FIG. 2 illustrates an exemplary charging port 202 that is connected to a charging link 208 that connects from the EVSE 114 to a charging inlet 204 of the EV 102 to provide electric power to replenish the battery 106 of the EV 102 with charging power. In one configuration, the charging port 202 may include a locking mechanism 206 that may be selectively enabled to securely lock the charging port 202 into place to avoid decoupling between the charging port 202 and the charging inlet 204 of the EV 102. The locking mechanism 206 may also be selectively disabled to unlock the charging port 202 from the charging inlet 204 of the EV 102.

In an exemplary embodiment, the system 100 may include a smart lock charge application 116 (smart lock application) that may be executed to provide computer-implemented instructions for locking the charging port 202 to the EV 102 through the charging inlet 204 to charge the electric vehicle 102 and/or one or more additional electric vehicles 120. The smart lock application 116 and its specific functionality will be discussed in more detail through this disclosure.

In one configuration, the charging port 202 and/or the EVSE 114 may include a user input keypad 210 (e.g., keypad and display) that allows an owner/operator of the EV 102 to input user credentials (e.g., a user input name/pin/password) that may be utilized by the smart lock application 116 to authenticate the owner/operator as an authorized user that is authorized to attach and remove the charging port 202 to and from the EV 102. In one embodiment, upon determining that the charging port 202 is attached to the EV 102 and/or upon receiving a user input of the user credentials, the smart lock application 116 may be configured to enable the locking mechanism 206 to securely lock the charging port 202 within the charging inlet 204, thereby locking the charging port 202 to the EV 102. Additionally, the smart lock application 116 may be configured to disable the locking mechanism 206 to unlock the charging port 202 from the charging inlet 204, thereby unlocking the charging port 202 from the EV 102 to allow decoupling of the charging port 202 from the EV 102.

The disablement of the locking mechanism 206 to unlock the charging port 202 may be based on receiving user authentication of the owner/operator of the EV 102 as the individual who is attempting to remove the charging port 202 from the charging inlet 204 of the EV 102. In one embodiment, the disablement of the locking mechanism 206 may be based on receiving user credentials through the user input keypad 210 that may be utilized by the smart lock application 116 to authenticate the owner/operator as the authorized user that is authorized to attach and remove the charging port 202 to and from the EV 102. In some circumstances, this functionality may prohibit unauthorized individuals (e.g., owners/operators of other electric vehicles) from removing the charging port from the EV 102 or additional electric vehicle 120 utilizing the EVSE 114.

Referring again to FIG. 1, the EVSE 114 may be configured to include a camera 122. The camera 122 may be configured to capture images of an owner/operator of the EV 102 (and/or one or more additional electric vehicles 120) as they begin to utilize the EVSE 114 and attach the charging port 202 to the EV 102. In particular, the owner/operator of the EV 102 may be prompted (e.g., through a display screen of the EVSE 114, a portable device, shown in FIG. 3, and/or through the charging port 202) to allow the camera 122 to capture a facial image of the owner/operator in order to recognize the owner/operator as an authorized user that is authorized to attach and remove the charging port 202 to and from the EV 102.

As discussed below, upon capturing a facial image of the owner/operator, the EVSE 114 may be configured to enable the locking mechanism 206 to securely lock the charging port 202 to the EV 102. Additionally, if an individual chooses to remove the charging port 202 from the EV 102, the smart lock application 116 may be configured to determine the attempted removal of the charging port 202 and may prompt the individual to capture a second facial image of the individual in order to recognize if the individual is the owner/operator. In other words, during removal of the charging port 202, a facial image of the individual may be captured and analyzed to determine if the individual is the previously captured authorized user (previously captured in a facial image during attachment of the charging port 202) that is authorized to attach and remove the charging port 202 to and from the EV 102.

In one embodiment, upon capturing the second facial image, the smart lock application 116 may be configured to compare image data from the first facial image with the second facial image using facial recognition logic to authenticate the owner/operator as an authorized user that is authorized to attach and remove the charging port 202 to and from the EV 102. Upon authentication of the owner/operator, the smart lock application 116 may be configured to disable the locking mechanism 206 to unlock the charging port 202 from the EV 102 or an additional electric vehicle 120 that is utilizing the EVSE 114. This functionality may additionally prohibit unauthorized individuals from removing the charging port 202 from the EV 102 or an additional electric vehicle 120 from utilizing the EVSE 114 during a charging session of the EV 102.

In additional configurations, the EVSE 114 may utilize additional information to authenticate an owner/operator of the EV 102 as an authorized user that is authorized to attach and remove the charging port 202 to and from the EV 102. For example, credit card information (e.g., that may be scanned by a scanner of the EVSE 114), driver's license information, automobile club information, charging station membership information, and the like may be utilized to authenticate the owner/operator prior to enablement and/or disablement of the locking mechanism 206. This functionality may also prohibit unauthorized individuals from removing the charging port from the EV 102 as it utilizes the EVSE 114 during a charging session of the EV 102.

With continued reference to FIG. 1 and FIG. 2, the charging station(s) 112 may be operably connected for computer communication with the EV 102 and/or the remote server 108, for example, to transmit and receive data (e.g., charge parameters, charging data and feedback, vehicle system data) to and from the EV 102 and/or the remote server 108. In one embodiment, the EV 102, the charging station(s) 112, the EVSE 114, and/or the charging port 202 may be operably controlled to initiate or terminate charging of the EV 102 from the charging station(s) 112 based on initiation by the authorized user (e.g., owner/operator) of the EV 102.

In one embodiment, the charging station(s) 112 may include a charging station identification designation (e.g., identification number, serial number, alpha-numeric code, station name) that may be used to identify particular charging stations 112. The charging station(s) 112 may replenish the battery 106 using a charging energy source type that indicates the type of energy the charging station(s) 112 provides. Energy may include clean renewable energy and non-renewable energy. Clean renewable energy may include, solar energy, hydro energy, biomass energy, wind energy, among others. Non-renewable energy may include electricity from a grid source, and in the case of hybrid vehicles, fossil fuels.

In an exemplary embodiment, some of the one or more charging stations 112 may institute measures in order to minimize wait times and/or queue lengths in order to facilitate electric vehicle charging of multiple electric vehicles (e.g., the EV 102 and one or more additional electric vehicles 120) through the EVSE 114. In one configuration, one of the measures that may be instituted by the charging station(s) 112 may include the allocation of parking citations that may be provided to owners/operators of electric vehicles that may be parked at a charging bay without an active connection between the charging port 202 of the EVSE 114 and their respective electric vehicle. Stated differently, the parking citations may be allocated to owners/operators of electric vehicles that park or continue to park at a charging bay of a particular charging station 112 without utilizing the EVSE 114 to actively charge their respective electric vehicles through the charging port 202.

The parking citations may each include a citation fee that may be accessed to the owners/operators of electric vehicles that are occupying charging bays without utilizing the charging port 202 to actively charge respective electric vehicle batteries. The citation fee may include, but may not be limited to a monetary fine, a surcharge, a time-based fee, and/or a penalty that may be associated with future queue placement at the particular charging station 112 that may be accessed to the owners/operators of electric vehicles that are occupying charging bays without utilizing the charging port 202. For example, if the EV 102 is occupying the charging bay after removal of the charging port 202 from the charging inlet 204, the EV 102 is no longer being actively charged and may be preventing one or more additional electric vehicles 120 from utilizing the charging bay to park near the EVSE 114 to charge their respective batteries. Accordingly, if the EV 102 is located at a charging station 112 that institutes parking citations, the owner/operator of the EV 102 may be issued a parking citation from the charging station 112.

In an exemplary embodiment, the EV 102, the charging station(s) 112, the additional electric vehicles 120, and/or the remote server 108 may receive and transmit data through the network 110 to a charging station computing infrastructure 118 (station computing infrastructure). The station computing infrastructure 118 may include one or more computing devices (not shown) that may communicate with one or more charging station business entities (e.g., charging station corporate owner) that may include utility providers, fuel providers, and/or entities that own and/or operate one or more various types of charging stations, fuel stations, energy stations, and the like. The charging station business entities may manage the parking citations and the collection of fines associated with parking citations that may be assigned to one or more electric vehicles. In one configuration, the station computing infrastructure 118 may communicate data associated with the issuance of one or more types of parking citations that may be implemented by one or more charging station business entities at one or more particular charging stations 112 to the smart lock application 116 through data transmission via the network 110.

In one or more embodiments, the smart lock application 116 may provide a means to detect and inform the owner/operator of the EV 102 about one or more charging stations 112 that may be located within a predetermined distance of the EV 102 that may issue parking citations. In one configuration, the smart lock application 116 may be configured to determine that the EV 102 is located within a predetermined distance of a particular charging station 112. The smart lock application 116 may be configured to determine if the charging station issues parking citations associated with parking of the EV 102 at the charging station 112 without actively charging the EV 102. If the smart lock application 116 determines that the charging port 202 of the EVSE 114 at the particular charging station 112 that issues parking citations is connected to the EV 102 to actively charge the EV 102, the application 116 may be configured to send a command to the EVSE 114 to enable the locking mechanism of the charging port 202 to avoid the parking citations. This functionary may ensure that only an authenticated user (e.g., authenticated by user credentials, facial image, payment information, driver license information, etc.) is able to unlock and remove the charging port 202 from the EV 102. In other words, the smart lock application 116 may send a command to the EVSE 114 to disable the locking mechanism 206 to unlock the charging port 202 from the charging inlet 204 of the EV 102 upon authenticating the owner/driver of the EV 102 to allow decoupling of the charging port 202 from the charging inlet 204.

Accordingly, the smart lock application 116 may ensure that the charging port 202 is securely locked into place to avoid decoupling from the charging inlet 204 of the EV 102 to avoid the risk of the EV 102 being issued a parking citation. The smart lock application 116 may ensure that the charging port 202 remains locked into place based on the continued enablement of the locking mechanism 206 even after charging of the EV 102 may be completed to avoid the risk of the EV 102 being issued a parking citation. The smart lock application 116 may thereby ensure that user authentication is utilized to authenticate the owner/operator of the EV 102 to disable the locking mechanism 206 to unlock and allow removal of the charging port 202 from the charging inlet 204 of the EV 102. This functionality may ensure that the owner/operator of the EV 102 is not issued parking citations based on the removal of the charging port 202 from the EV 102 by unauthorized individuals. Stated differently, this functionality may ensure that the EV 102 is not parked at the charging bay of the charging station 112 without being actively charged by the EVSE 114 based on the removal of the charging port 202 from the charging inlet 204 by an unauthorized individual, thereby avoiding parking citations to be issued to the owner/operator of the EV 102 by the charging station 112.

As discussed below, the smart lock application 116 may additionally be configured to present a notification alert to the owner/operator of the EV 102 upon determining that an authorized user is attempting to remove the charging port 202 from the EV 102 (as its locked and/or unlocked). In particular, the smart lock application 116 may be configured to provide one or more user interfaces to the owner/operator of the EV 102 that may provide the notification alert. Accordingly, if the owner/operator is not located near the EV 102 (e.g., in a visible distance to the EV 102), they may be alerted of the unauthorized attempt to remove the charging port 202 from the EV 102 and may thereby inspect the charging status of the EV 102.

In additional embodiments, the smart lock application 116 may be configured to provide one or more user interfaces to the owner/operator of the EV 102 to enable the owner/operator to create a user profile. The user profile may include, but may not be limited to, user information (e.g., name/address/phone) associated with the owner/operator, user credentials that may be inputted through the user interface(s) to be utilized to authenticate the owner/operator as an authenticated user, payment information, driver's license information, automobile club information, charging station membership information, and the like that may be utilized to determine that an authorized user is both attaching and removing the charging port 202 to and from the EV 102. The user profile may be stored at the EV 102 and may be accessed to authenticate the owner/operator of the EV 102 as an authenticated user.

Figure 3:
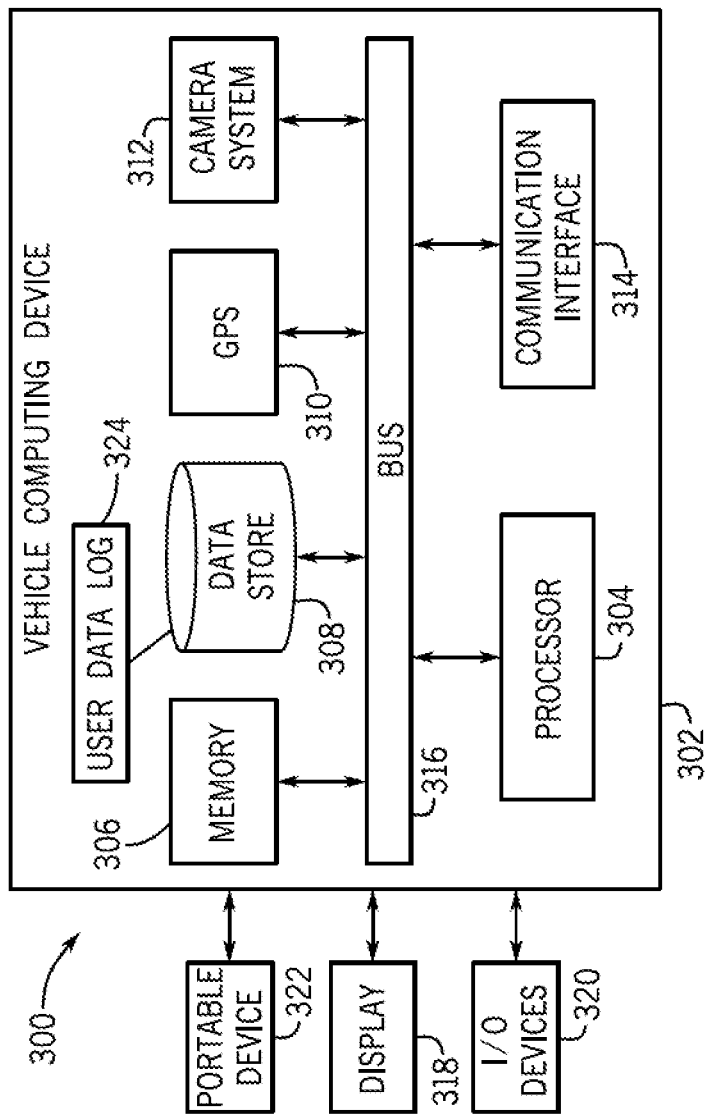
FIG. 3 is a schematic view of an illustrative electric vehicle architecture according to an exemplary embodiment of the present disclosure.

Referring now to FIG. 3, a schematic view of an illustrative electric vehicle architecture 300, for example the EV 102 of FIG. 1, is shown according to an exemplary embodiment. In particular, the EV 102 may include a vehicle computing device 302 (e.g., a telematics unit, an electronic control unit) with provisions for processing, communicating and interacting with various components of the EV 102 and other components of the system 100. The vehicle computing device 302 may include a processor 304, a memory 306, a data store 308, a position determination device 310 (GPS), a camera system 312, and a communication interface 314. The components of the architecture 300, including the vehicle computing device 302, may be operably connected for computer communication via a bus 316 (e.g., a Controller Area Network (CAN) or a Local Interconnect Network (LIN) protocol bus) and/or other wired and wireless technologies. The vehicle computing device 302 as well as the EV 102 may include other components and systems not shown.

The data store 308 may store application data that may also include data pertaining to the smart lock application 116. In one embodiment, the data store 308 of the EV 102 may include a user data log 324 that may store the user profile associated with the owner/operator of the EV 102. In some configurations, the user profile stored upon the data store 308 of the vehicle computing device 302 may be accessed by the smart lock application 116 to authenticate the owner/operator of the EV 102 as an authenticated user.

In some configurations, the data store 308 may additionally store citation data that may be associated with one or more parking citations that may have been (previously) issued by one or more particular charging stations 112. The citation data may include each particular parking citation number, the particular charging station 112 and charging bay where the owner/operator of the EV 102 was issued the parking citation, the particular fine associated with the parking citation, and the like may be updated upon the user data log 324 during each parking citation issuance. In some embodiments, the smart lock application 116 may be configured to evaluate the user data log 324 to determine if a particular charging station 112 that may be utilized by the EV 102 issues parking citations to electric vehicles that are not attached to a respective charging port 202 of an EVSE 114.

In one embodiment, the camera system 312 of the EV 102 may include one or more of the cameras (not shown) that may be positioned in one or more directions to capture images of one or more areas of a roadway and one or more environments in which the EV 102 is traveling. For example, the one or more cameras may be configured to capture images of one or more portions of the charging station(s) 112, and specifically, the charging bay and/or the EVSE 114 that is located within a predetermined distance of the EV 102. In one embodiment, upon determining that the EV 102 is located at a particular charging station 112, the smart lock application 116 may be configured to communicate with the camera system 312 to receive image data associated with one or more portions of the charging station 112.

In an exemplary embodiment, upon receipt of the image data, the smart lock application 116 may be configured to execute image logic to determine if any signage is captured that may indicate that the particular charging station 112 may access a parking citation for vehicles that are parked without active connection to EVSE 114. Accordingly, if the charging station(s) 112 include any signage that indicates that parking citations may be accessed to vehicles that are not attached to the charging port 202 of a respective EVSE 114, the smart lock application 116 may be configured to analyze image data associated with image(s) of the signage at the charging station(s) 112 to determine that the charging station(s) 112 issues parking citations associated with parking at the charging station(s) 112 without an active connection between the charging port 202 and the EV 102.

In one or more embodiments, the communication interface 314 of the EV 102 may provide software, firmware and/or hardware to facilitate data input and output between the components of the vehicle computing device 302 and other components, networks and data sources. Further, the communication interface 214 may facilitate communication with a display 318 (e.g., a head unit, a display stack, a heads-up display) in the EV 102 and other input/output devices 320, for example, a portable device 322 (e.g., key fob, smart phone) connected to the EV 102.

In some embodiments the portable device 322 may include some or all of the components and functionality of the vehicle computing device 302. Additionally, the communication interface 314 may facilitate communication between the EV 102 and the portable device 322 that may include a display and/or input/output devices (not shown) be used to operate various functions of the EV 102. In one embodiment, the display 318 of the EV 102 and/or the portable device 322 (e.g., through a display screen of the portable device 322) may be utilized to provide one or more user interfaces that may be included as a human machine interface(s) of the smart lock application 116.

Figure 4:
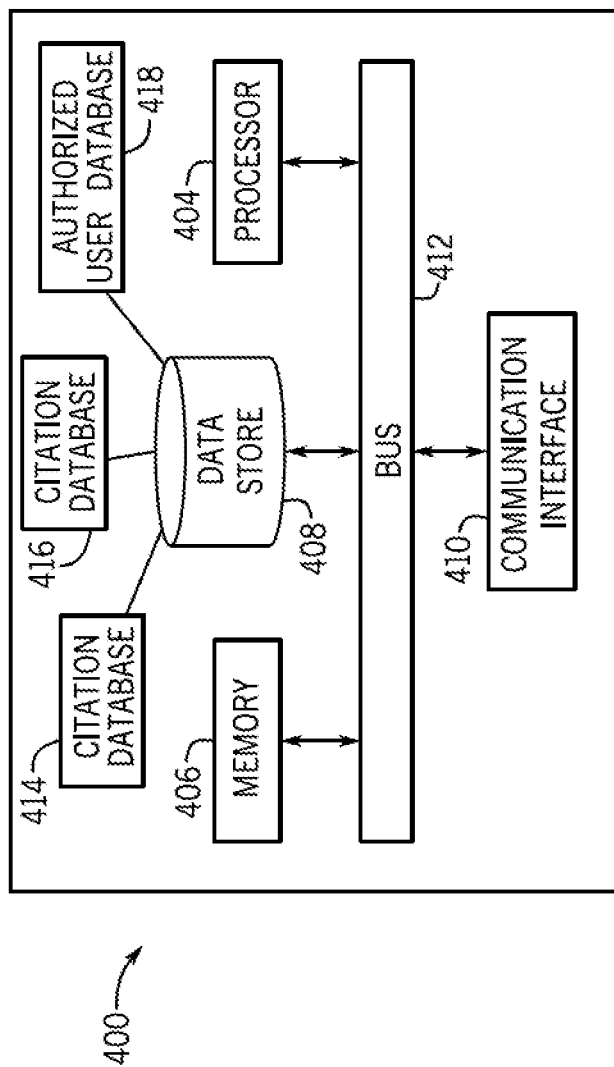
FIG. 4 is a schematic view of an illustrative remote server architecture according to an exemplary embodiment of the present disclosure.

Referring now to FIG. 4, a schematic view of an illustrative remote server architecture 400, for example the remote server 108 of FIG. 1, is shown according to an exemplary embodiment. The remote server 108, is located remotely (i.e., off-board) from the EV 102 (as shown in FIG. 1). In some embodiments, the remote server 108 may be maintained by a charging station entity, an Original Equipment Manufacturer (OEM) (e.g., of the EV 102), a utility provider, a regulatory body, among others. In additional embodiments, the remote server 108 may be another type of remote device or supported by a cloud architecture. In FIG. 4, the remote server 108 may include a computing device 402 that may further include a processor 404, a memory 406, a data store 408 and a communication interface 410. The components of the architecture 400, including the computing device 402, may be operably connected for computer communication via a bus 412 and/or other wired and wireless technologies. The computing device 402 as well as the remote server 108 may include other components and systems not shown.

The data store 408 may store application data that may also include data pertaining to the smart lock application 116. In one configuration, the data store 408 may store a station database 414 that may include respective records of charging stations 112 that may be owned and/or operated by one or more charging station entities. The station database 414 may include records that each pertain to particular charging stations 112 that include data that may be pre-updated and/or updated in real-time by one or more charging station entities. In one configuration, the station database 414 may include records that may pertain to particular charging stations 112 and their respective geo-locations (GPS/DGPS coordinates of the charging station(s) 112). Additionally, each of the records of the station database 414 that pertain to particular charging stations 112 may include charging station identification designations that are associated with the respective charging stations 112.

The station database 414 may also include records that may pertain to parking citations that may be accessed by each particular charging station 112. The records may include data that pertain to fines that may be implemented and charged to owner/operators of electric vehicles that are parked within charging bays of each particular charging station 112 without an active connection with the charging port 202. In some embodiments, some charging stations 112 may selectively implement the parking citations based on one or more factors that may include, demand response signals, high demand timeframe, low demand timeframe, queue length, weather conditions, and the like. Accordingly, the station database 414 may be accessed by the smart lock application 116 to determine if one or more charging stations 112 are implementing the parking citations in real-time as the EV 102 is located within a predetermined distance of the charging station(s) 112 or is located at one of the charging station(s) 112. The smart lock application 116 may thereby present one or more user interfaces to the owner/operator of the EV 102 notifying the owner/operator of the real-time implementation of the parking citations by the charging station(s) 112. This functionality may allow the owner/operator of the EV 102 to make an informed determination to utilize or not utilize the particular charging station(s) 112 to recharge the battery 106 of the EV 102.

In an exemplary embodiment, the data store 308 may additionally store a citation database 416. The citation database 416 may be configured as a relational database that includes records that are associated with identification numbers (e.g., VIN) of electric vehicles that may each utilize a respective charging station 112. The citation database 416 may further include user credentials that may be associated with the owners/operators of electric vehicles that may utilize each respective charging station 112. In one configuration, if a particular charging station 112 issues a parking citation to a particular electric vehicle such as the EV 102, the charging station 112 may be configured to communicate data pertaining to the particular parking citation through the network 110 to the remote server 108. Accordingly, data associated with the particular parking citation, the particular charging bay of the EV 102, the particular fine associated with the parking citation, and the like may be updated upon the citation database 416 stored upon the data store 408 of the remote server architecture 400.

In some embodiments, upon determining that the EV 102 is located within a predetermined location of a charging station(s) 112 or is located at a charging station(s) 112, the smart lock application 116 may be configured to access and evaluate the citation database 416 to determine if the EV 102 had previously been accessed one or more parking citations by the charging station(s) 112. If it is determined that the EV 102 had previously been accessed one or more parking citations by the charging station(s) 112, the smart lock application 116 may be configured to present one or more user interfaces to the owner/operator of the EV 102 notifying the owner/operator of the previously accessed parking citation(s), past paid fine(s), and/or past un-paid fine(s) that may be associated with the charging station(s) 112. This functionality may allow the owner/operator of the EV 102 to make an informed determination to utilize or not utilize the particular charging station(s) 112 to recharge the battery 106 of the EV 102.

In one or more embodiments, the data store 408 may also store an authorized user database 418. The authorized user database 418 may be configured as a relational database that stores records that are associated with authorized users that are authorized to attach and remove the charging port 202 to and from particular electric vehicles. In particular, the authorized user database 418 may include respective records that includes user credentials associated with the owner/operators of respective electric vehicles that may utilize the charging station(s) 112 at one or more points in time. As discussed above, the user credentials may be utilized to enable locking or unlocking of the locking mechanism 206 of the charging port 202 based on the determination that an authorized user is both locking and unlocking the charging port 202. In an additional embodiment, each record of the authorized user database 418 may be populated with image data that may be received from the camera 122 of the EVSE 114. As discussed above, the image data may be compared to image data of a subsequently captured image of an individual who is attempting to remove the charging port 202 from the EV 102 to determine that the individual is the authorized user that is authorized to attach and remove the charging port 202 to and from the EV 102.

In some configurations, each of the records of the authorized user database 418 may additionally include payment information (e.g., credit card information), driver's license information (e.g., driver's license number), automobile club information, and/or charging station membership information that may be utilized by the smart lock application 116 to determine that an authorized user is both locking and unlocking the charging port 202. Such a determination may allow the application 116 to allow the locking mechanism 206 to be disabled upon determining that an authorized user is attempting to unlock and remove the charging port 202 from the EV 102.

In one configuration, the communication interface 410 of the remote server architecture 400 may provide software, firmware and/or hardware to facilitate data input and output between the components of the computing device 402 and other components, networks and data sources. In some embodiments, the communication interface 410 may be used to communicate with the EV 102, the charging station(s) 112, the portable device 322, additional electric vehicles 120, and/or other components of system 100 and architecture 400.

II. The Smart Lock Charge Application and Related Methods

The smart lock application 116 and its components will now be discussed in more detail according to an exemplary embodiment and with continued reference to FIGS. 1-4. In one or more embodiments, the smart lock application 116 may be executed by the vehicle computing device 302 of the EV 102 and/or the computing device 402 of the remote server 108. In an alternate embodiment, the smart lock application 116 may be executed by a processor (not shown) of the portable device 222 that may be used by the operator of the EV 102.

In one or more configurations, data may be sent or received from the smart lock application 116 to the components of the EV 102, the remote server 108, the charging station(s) 112, the EVSE 114, the charging port 202, the locking mechanism 206, the portable device 222, and/or the additional electric vehicles 120. For example, commands from the smart lock application 116 may be sent to the EVSE 114, the charging port 202, and/or the locking mechanism 206 of the charging port to enable locking of the charging port 202 to lock the charging port 202 to the charging inlet 204 of the EV 102 and/or disable locking of the charging port 202 to unlock the charging port 202 from the charging inlet 204.

In an exemplary embodiment, the smart lock application 116 may include one or more user input interfaces and/or input means (e.g., buttons) that may be presented via the display 318, presented via the portable device 322, and or included within the EV 102 and/or on the portable device 322. In one embodiment, the one or more user input interfaces and/or input means may include user interface inputs that may be utilized by the owner/operator of the EV 102 to enable or disable the presentation of one or more user interface notifications that may be presented by the smart lock application 116. Additionally, the one or more user input interfaces and/or input means may include user interface inputs that may be utilized by the owner/operator of the EV 102 to enable or disable one or more functions such as enablement or disablement of locking and/or utilization of user credentials, facial recognition data, and/or image data provided by the smart lock application 116.

Figure 5:
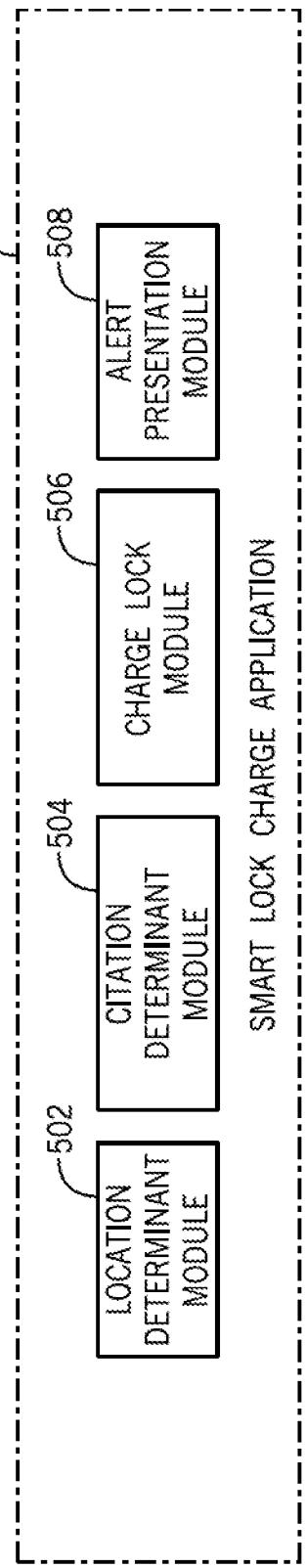
FIG. 5 is a schematic view of a plurality of modules of a smart lock application that may execute computer-implemented instructions for locking the charging port to charge the EV according to an exemplary embodiment of the present disclosure.

FIG. 5 is a schematic view of a plurality of modules 502-508 of the smart lock application 116 that may execute computer-implemented instructions for locking the charging port 202 to charge the EV 102 according to an exemplary embodiment of the present disclosure. In an exemplary embodiment, the plurality of modules 502-508 may include a location determinant module 502, a citation determinant module 504, a charge lock module 506, and an alert presentation module 508. It is appreciated that the smart lock application 116 may include one or more additional modules and/or sub-modules that are included in lieu of the modules 502-508.

Figure 6:
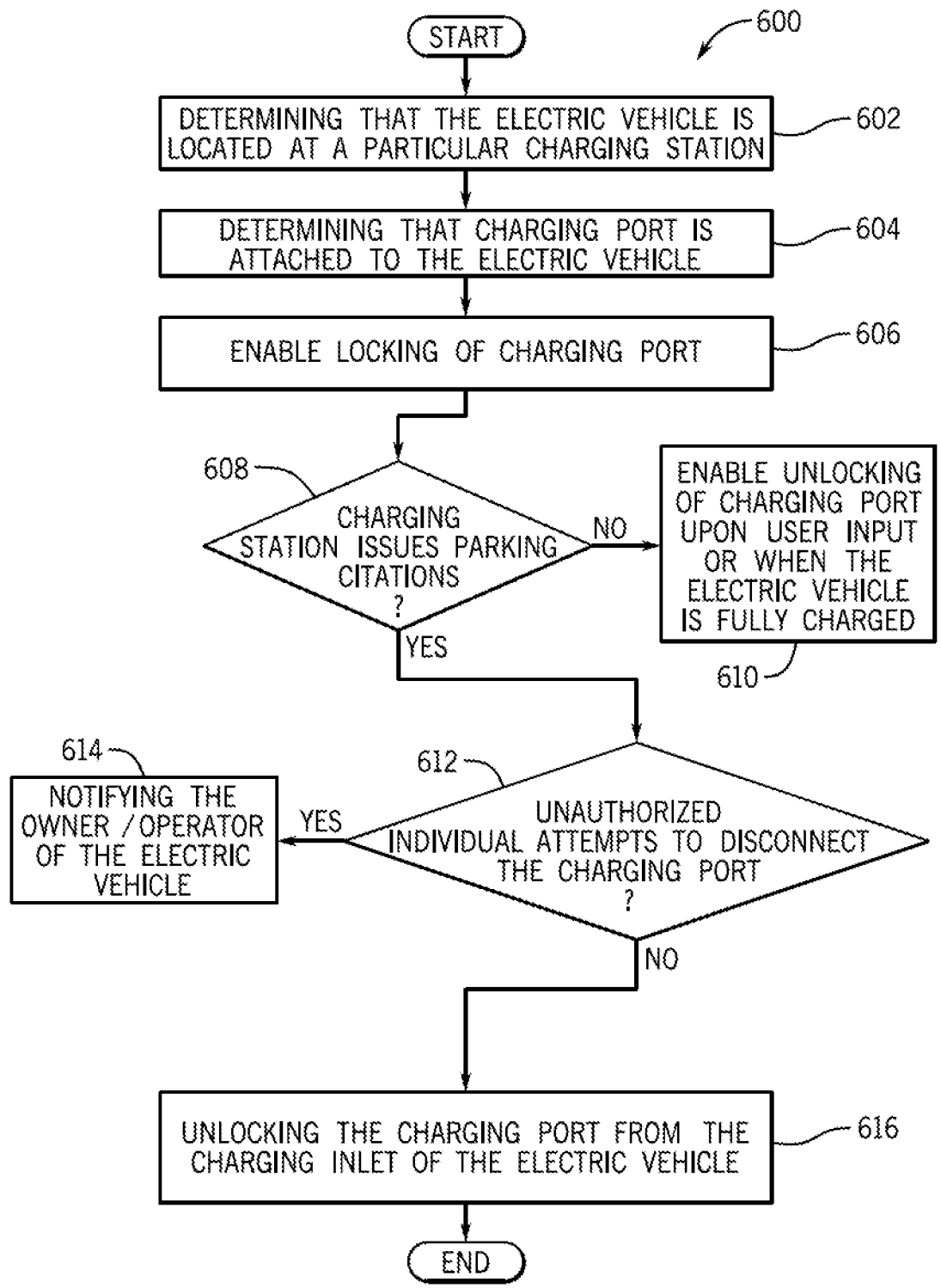
FIG. 6 is a process flow diagram of a method for locking and unlocking the charging port from the charging inlet of the EV according to an exemplary embodiment of the present disclosure.

FIG. 6 is a process flow diagram of a method 600 for locking and unlocking the charging port 202 from the charging inlet 204 of the EV 102 according to an exemplary embodiment of the present disclosure. FIG. 6 will be described with reference to the components of FIG. 1-FIG. 5, though it is to be appreciated that the method 600 of FIG. 6 may be used with additional and/or alternative system components. It is appreciated that the method 600 of FIG. 6 may be executed by smart lock application 116 during charging of the EV 102 and/or one or more additional electric vehicles 120. However, for purposes of simplicity, the method 600 will be described with respect to charging of the EV 102.

The method 600 may begin at block 602, wherein the method 600 may include determining that the EV 102 is located at a particular charging station 112. In an exemplary embodiment, the location determinant module 502 of the smart lock application 116 may be configured to determine if the EV 102 is located within a predetermined distance of one or more charging stations 112 and/or is located at a particular charging station 112. The location determinant module 502 may be configured to communicate with the GPS 310 of the EV 102 to determine the current geo-location of the EV 102 at one or more points in time. In some embodiments, the location determinant module 502 may be configured to store one or more geo-locations of the EV 102 as determined at one or more points in time within the data store 308 of the vehicle computing device 302 of the EV 102 and/or the data store 408 of the computing device 402 of the remote server 108.

In one embodiment, upon receiving data pertaining to a current geo-location of the EV 102, the location determinant module 502 may be configured to determine geo-locations of one or more charging stations 112 that may be located within the predetermined distance or at a current geo-location of the EV 102. In particular, the location determinant module 502 may be configured to access and query the station database 414 to determine one or more charging stations 112 that may be located within the predetermined distance (e.g., 5 miles) of the current geo-location of the EV 102 or may be located at a matching geo-location (e.g., current geo-location coordinates) of the EV 102. Upon determining the one or more charging stations 112 that may be located within the predetermined distance of the current geo-location of the EV 102 or match the current geo-location of the EV 102, the location determinant module 502 may communicate data pertaining to the charging station(s) 112 to the citation determinant module 504 of the smart lock application 116.

With continued reference to the method 600, the method 600 may proceed to block 604, wherein the method 600 may include determining that the charging port 202 is attached to the EV 102. In one embodiment, upon receiving the communication regarding the determination that the EV 102 is located within a predetermined distance of the charging station(s) 112 or that the EV 102 is located at a particular charging station 112, the citation determinant module 504 may be configured to communicate with the vehicle computing device 302 of the EV 102 to determine if there is a connection between the charging port 202 of the EVSE 114 and the charging inlet 204 of the EV 102 to output charging power to the battery 106 of the EV 102.

In particular, the charging inlet 204 may include one or more sensors (e.g., pressure sensors) (not shown) that may be configured to sense the attachment of the charging port 202 to charge the battery 106 of the EV 102. The one or more sensors may also be configured to sense the detachment of the charging port 202 from the charging inlet 204. In one configuration, the one or more sensors may also be configured to sense one or more movements that may indicate that an individual is attempting to detach the charging port 202 from the charging inlet 204. In other words, the one or more sensors of the charging port 202 may be configured to sense movement of the charging port 202 with respect to the charging inlet 204 which may indicate that someone is attempting to decouple the charging port 202 from the charging inlet 204 to remove the charging port 202 from the EV 102.

In one embodiment, upon sensing the attachment of the charging port 202, the charging inlet 204 may communicate respective data to the vehicle computing device 302. Accordingly, the vehicle computing device 302 may be configured to communicate data pertaining to the attachment of the charging port 202 to the citation determinant module 504. In an alternate embodiment, upon receiving the communication regarding the determination that the EV 102 is located within a predetermined distance of the charging station(s) 112 or that the EV 102 is located at a particular charging station 112, the citation determinant module 504 may be configured to communicate with the EVSE 114 directly to determine if there is a connection between the charging port 202 of the EVSE 114 and the charging inlet 204 of the EV 102 to output charging power to the battery 106 of the EV 102.

In particular, the charging port 202 may include one or more sensors (e.g., pressure sensors) (not shown) that may be configured to sense the attachment to the charging inlet 204 of the EV 102 to charge the battery 106 of the EV 102. The one or more sensors may also be configured to sense a detachment of the charging port 202 from the charging inlet 204. Additionally, the one or more sensors of the charging port 202 may be configured to sense movement of the charging port 202 that may indicate that someone is attempting to decouple the charging port 202 from the charging inlet 204 to remove the charging port 202 from the EV 102. In one embodiment, upon the one or more sensors, sensing the attachment of the charging port 202 to the charging inlet 204, the EVSE 114 may receive sensor data from the charging port 202 indicating the attachment to the EV 102. Accordingly, the EVSE 114 may be configured to communicate data pertaining to the attachment of the charging port 202 to the citation determinant module 504.

With continued reference to the method 600, the method 600 may proceed to block 606, wherein the method 600 may include enabling locking of the charging port 202. In an exemplary embodiment, upon determining attachment of the charging port 202 to the EV 102, the citation determinant module 504 may communicate data pertaining to the attachment of the charging port 202 to the charge lock module 506 of the smart lock application 116. In an exemplary embodiment, the charge lock module 506 may be configured to selectively enable the locking mechanism 206 of the charging port 202 to securely lock the charging port 202 into place to avoid decoupling between the charging port 202 and the charging inlet 204 of the EV 102. In particular, the charge lock module 506 may be configured to communicate a locking command to the EVSE 114 to enable the locking mechanism 206 to securely lock the charging port 202 within the charging inlet 204, thereby locking the charging port 202 to the EV 102.

In one embodiment, the charge lock module 506 may send a command to the EVSE 114 to operably control the user input keypad 210 (e.g., keypad and display) to present a prompt to the owner/operator of the EV 102 to input user credentials (e.g., a user input name/pin/password) that may be utilized to authenticate the respective owner/operator as an authorized user. Upon receiving a user input of the user credentials, the charge lock module 506 may be configured to enable the locking mechanism 206 to securely lock the charging port 202 within the charging inlet 204, thereby locking the charging port 202 to the EV 102.

In another embodiment, the charge lock module 506 may communicate with the EVSE 114 to receive image data associated with images captured by the camera 122 of the EVSE 114. In one embodiment, the camera 122 may be configured to capture images of the owner/operator of the EV 102 as they begin to utilize the EVSE 114. In particular, the owner/operator of the EV 102 may be prompted to allow the camera 122 to capture a facial image of the owner/operator in order to recognize the owner/operator as an authorized user of the EV 102. In one embodiment, upon capturing a facial image of the owner/operator, the charge lock module 506 may be configured to enable the locking mechanism 206 to securely lock the charging port 202 to the EV 102. Upon locking the charging port 202 to the EV 102, the charge lock module 506 may communicate respective data to the citation determinant module.

With continued reference to the method 600, the method 600 may proceed to block 608, wherein the method 600 may include determining if the charging station 112 issues parking citations. In an exemplary embodiment, upon determining that the charging port 202 is attached to the EV 102 and the locking mechanism 206 has been enabled to lock the charging port 202 to the EV 102, the citation determinant module 504 may be configured to access and query the station database 414 to determine and/or confirm the charging station 112 at which the EV 102 is receiving charging power from the EVSE 114 based on the current geo-location of the EV 102. Upon determining and/or confirming the particular charging station 112 at which the EV 102 is being charged, the citation determinant module 504 may be configured to communicate with the charging station 112 (e.g., through the EVSE 114) to receive the charging station identification designation associated with the particular charging station 112 that is being utilized to charge the EV 102.

In one embodiment, upon receiving the charging station identification designation associated with the particular charging station 112, the citation determinant module 504 may be configured to access the station database 414. As discussed above, each of the records of the station database 414 that pertain to particular charging stations 112 may include charging station identification designations that are associated with the respective charging stations 112. In one configuration, upon accessing the station database 414, the citation determinant module 504 may be configured to query the station database 414 based on the charging station identification designation of the charging station 112 being utilized to charge the EV 102. The citation determinant module 504 may thereby retrieve the record pertaining to the charging station 112 that is being utilized to charge the EV 102.

In one configuration, in the case that the charging station 112 issues parking citations, the record pertaining to the charging station 112 may also include data that pertains to parking citations that may be accessed by the charging station 112. Such data may indicate fines that may be implemented and charged to owner/operators of electric vehicles that are parked within charging bays of the particular charging station 112 without an active connection with the charging port 202. Accordingly, if the record pertaining to the particular charging station being utilized by the EV 102 includes data that pertains to parking citations that may be issued by the charging station 112, the citation determinant module 504 may thereby determine that the charging station issues parking citations.

In an additional embodiment, the citation determinant module 504 may determine that the charging station 112 issues parking citations based on image data that may be provided by the camera system 312 of the EV 102. As discussed above, the one or more cameras may be configured to capture images of one or more portions of the charging station(s) 112, and specifically, the charging bay and/or the EVSE 114 that is being utilized to charge the battery 106 of the EV 102. In one embodiment, the citation determinant module 504 may be configured to communicate with the camera system 312 to receive image data associated with one or more portions of the charging station 112.

In an exemplary embodiment, upon receipt of the image data, the citation determinant module 504 may be configured to execute image logic to determine if any signage is captured that may indicate that the charging station 112 that is being utilized by the EV 102 may access a parking citation for vehicles that are parked without an active connection to EVSE 114. Accordingly, if the charging station(s) 112 include any signage that indicates that parking citations may be accessed to vehicles that are not being actively connected to the EVSE 114, the citation determinant module 504 may be configured to analyze image data associated with image (s) of the signage at the charging station(s) 112 to determine that the charging station 112 issues parking citations associated with parking of vehicles without an active connection between the charging port 202 and the EV 102.

In some embodiments, if the citation determinant module 504 determines that the charging station 112 issues parking citations, the citation determinant module 504 may communicate respective data to the alert presentation module 508 of the smart lock application 116. The alert presentation module 508 may be configured to communicate with the vehicle computing device 302, the portable device 322 and/or the EVSE 114 to present one or more user interfaces to the owner/operator of the EV 102 notifying the owner/operator of the real-time implementation of the parking citations by the charging station(s) 112. This functionality may allow the owner/operator of the EV 102 to make an informed determination to continue to utilize or not utilize the charging station 112 to charge the battery 106 of the EV 102.

With continued reference to FIG. 6, if it is determined that the charging station 112 does not issue parking citations (at block 608), the method 600 may proceed to block 610, wherein the method 600 may include unlocking the charging port 202 upon user input or when the EV 102 is fully charged. In an exemplary embodiment, the charge lock module 506 may communicate with the charging port 202 and/or the EVSE 114 to determine if the one or more sensors of the charging inlet 204 and/or the charging port 202 sense movement of the charging port 202 with respect to the charging inlet 204 which may indicate that someone is attempting to decouple the charging port 202 from the charging inlet 204 to remove the charging port 202 from the EV 102. Additionally, or alternatively, the charge lock module 506 may communicate with the vehicle computing device 302 of the EV 102 to determine when the battery 106 of the EV 102 has reached a full state of charge.

In one embodiment, if the charge lock module 506 determines that someone is attempting to remove the charging port 202 from the EV 102 and/or the battery 106 of the EV 102 has reached a full state of charge (i.e., the EV is fully charged), the charge lock module 506 may send an unlock command to the EVSE 114. Upon receipt of the unlock command, the EVSE 114 may be configured to disable the locking mechanism 206 to unlock the charging port 202 from the charging inlet 204 to allow removal of the charging port 202 from the charging inlet 204 of the EV 102.

Referring again to block 608 of the method 600, if it is determined that the charging station 112 issues parking citations, the method 600 may proceed to block 612, wherein the method 600 may include determining that an unauthorized individual attempts to disconnect the charging port 202. In an exemplary embodiment, upon determining that the charging station 112 issues parking citations, the citation determinant module 504 may be configured to communicate respective data to the charge lock module 506. The charge lock module 506 may be configured to thereby communicate with the EVSE 114 and/or the vehicle computing device 302 to determine if the one or more sensors of the charging port 202 and/or the charging inlet 204 sense movement of the charging port 202 with respect to the charging inlet 204 which may indicate that someone is attempting to decouple the charging port 202 from the charging inlet 204 to remove the charging port 202 from the EV 102.

If someone attempts to remove the charging port 202 from the charging inlet 204 of the EV 102, the one or more sensors may communicate respective data to the charge lock module 506. In one embodiment, the charge lock module 506 may thereby communicate with the vehicle computing device 302, the portable device 322, the EVSE 114, and/or the charging port 202 to present a notification prompt that may prompt the individual who is attempting to remove the charging port 202 to input user credentials (e.g., a user input name/pin/password) that may be utilized to authenticate the respective owner/operator as an authorized user. As discussed above, in one embodiment, the charge lock module 506 may prompt the owner/operator of the EV 102 to input user credentials to operably control the locking mechanism 206 to lock the charging port 202 to the EV 102. In one configuration, upon prompting the individual who is attempting to remove the charging port 202 to input user credentials, the charge lock module 506 may be configured to determine if user credentials associated with the owner/operator of the EV 102 have been received within a predetermined period of time (e.g. 3 minutes). If the charge lock module 506 determines that the user credentials associated with the owner/operator of the EV 102 have not been received within the predetermined period of time, the charge lock module 506 may thereby determine that an authorized user attempts to disconnect the charging port 202 from the EV 102.

In an alternate embodiment, the one or more sensors may communicate data to the charge lock module 506 pertaining to someone attempting to remove the charging port 202 from the charging inlet 204 of the EV 102, the charge lock module 506 may communicate data to the EVSE 114 to prompt the individual attempting to remove the charging port 202 to capture a facial image of the individual in order to determine if the individual is the owner/operator of the EV 102 and is authorized to disconnect the charging port 202 from the EV 102.

In one embodiment, if the individual allows the camera 122 to capture an image of the individual, image data may be communicated by the EVSE 114 to the charge lock module 506. The charge lock module 506 may be configured to compare the image data from the facial image associated with the owner/operator of the EV 102 (previously captured, as discussed above at block 606) with the facial image of the individual using facial recognition logic to authenticate the owner/operator as an authorized user. If the individual does not allow the camera 122 to capture the image of the individual or there is not a match found between the facial image associated with the owner/operator of the EV 102 (captured at block 606) and the facial image of the individual attempting to remove the charging port 202, the charge lock module 506 may determine that the unauthorized individual attempts to disconnect the charging port 202 from the EV 102.

Referring again to block 612, if it is determined that an unauthorized individual attempts to disconnect the charging port 202, the method 600 may proceed to block 614, wherein the the method 600 may include notifying the owner/operator of the EV 102. In an exemplary embodiment, upon determining that an unauthorized individual attempts to disconnect the charging port 202, the charge lock module 506 may communicate respective data to the alert presentation module 508 of the smart lock application 116. In one or more embodiments, the alert presentation module 508 may be configured to communicate with the vehicle computing device 302 and/or the portable device 322 to present one or more user interfaces that present a notification alert to the owner/operator of the EV 102 that an unauthorized individual is attempting to disconnect the charging port 202 of the EVSE 114 from the EV 102. Accordingly, if the owner/operator is not located near the EV 102, the owner/operator may be able to determine if they should physically return to the EV 102 to check on the charging status associated with the state of charge of the battery 106 of the EV 102.

In some embodiments, the alert presentation module 508 may be configured to communicate with the vehicle computing device 302 to determine the current state of charge of the battery 106 of the EV 102. The alert presentation module 508 may be configured to include the current state of charge of the battery 106 of the EV 102 as part of the one or more user interfaces that may notify the owner/operator of the EV 102 that an unauthorized individual is attempting to disconnect the charging port 202 of the EVSE from the EV 102. Accordingly, the owner/operator of the EV 102 may be able to determine a charging status of the battery 106 of the EV 102 without having to physically return to the EV 102.

Referring again to block 612 of the method 600, if it is determined that the unauthorized individual does not attempt to disconnect the charging port, the method 600 may proceed to block 616, wherein the method 600 may include unlocking the charging port 202 from the charging inlet 204 of the EV 102. In an exemplary embodiment, based on receiving user credentials that match the user credentials of the owner/operator of the EV 102 based on user input of the user credentials to the user input keypad 210 (as discussed above at block 612) or determining that there is a match found between the facial image associated with the owner/ operator of the EV 102 (captured at block 606) and the facial image of the individual attempting to remove the charging port 202 (captured at block 612), the charge lock module 506 may determine that the owner/operator is attempting to disconnect the charging port 202 from the EV 102.

In an exemplary embodiment, the charge lock module 506 may communicate with the EVSE 114 to disable the locking mechanism 206 of the charging port 202 to unlock the charging port 202 from the EV 102. Accordingly, the charging port 202 may be decoupled from the charging inlet 204 of the EV 102. The owner/operator may thereby avoid receiving any parking citations that may be provided by the charging station 112 to the owner/operator of EV 102 since the EV 102 is not parked within the charging bay without an active connection between the EV 102 and the charging port 202 of the EVSE 114.

Figure 7:
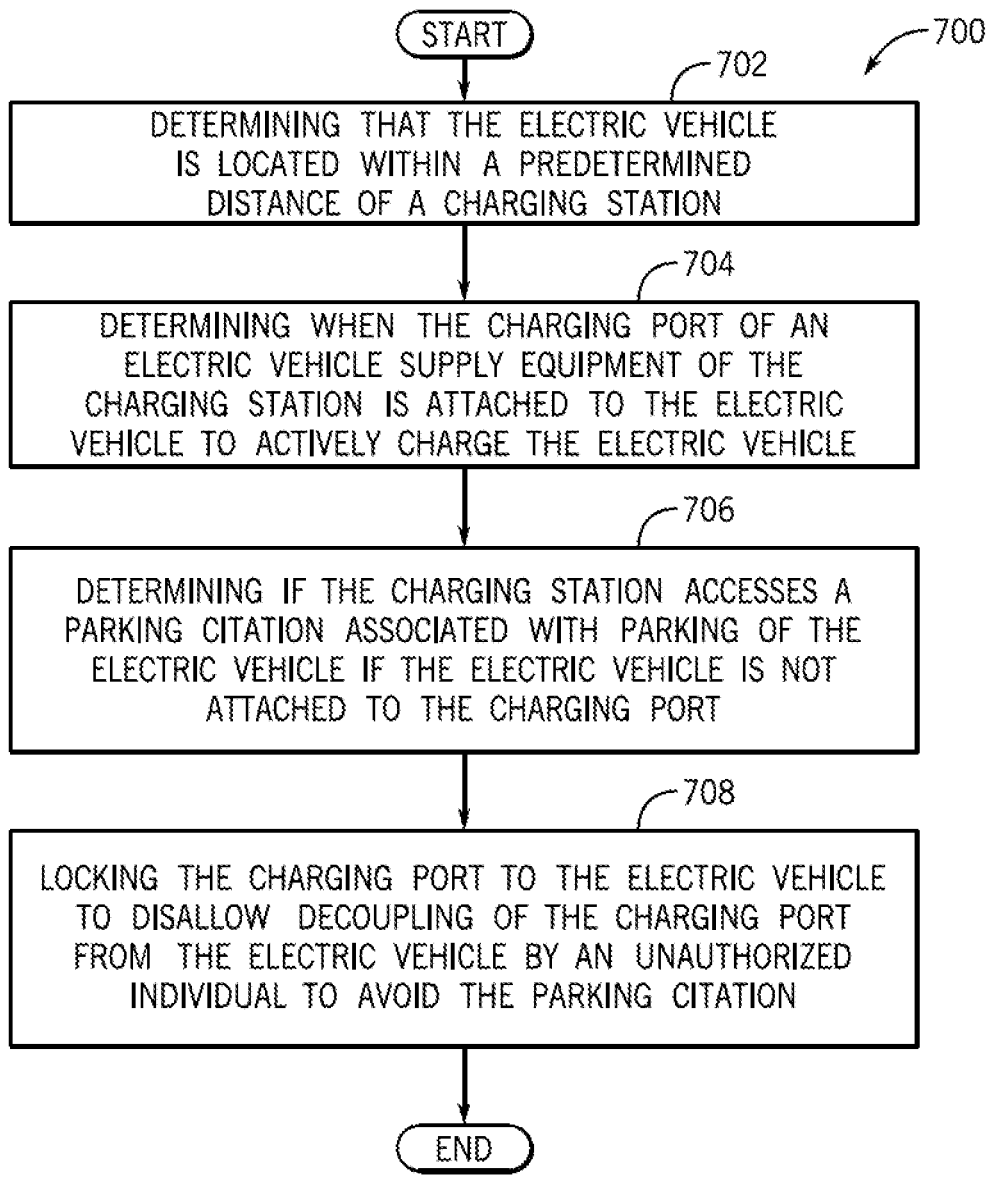
FIG. 7 is a process flow diagram of a method for locking the charging port to charge the EV according to an exemplary embodiment of the present disclosure.

FIG. 7 is a process flow diagram of a method 700 for locking a charging port 202 to charge the EV 102 according to an exemplary embodiment of the present disclosure. FIG. 7 will be described with reference to the components of FIG. 1-FIG. 5, though it is to be appreciated that the method 700 of FIG. 7 may be used with additional and/or alternative system components. The method 700 may begin at block 702, wherein the method 700 may include determining that the EV 102 is located within a predetermined distance of a charging station 112.

The method 700 may proceed to block 704, wherein the method 700 may determining when the charging port 202 of an EVSE 114 of the charging station 112 is attached to the EV 102 to actively charge the EV 102. The method 700 may proceed to block 706, wherein the method 700 may include determining if the charging station 112 accesses a parking citation associated with parking of the EV 102 if the EV 102 is not attached to the charging port 202. The method 700 may proceed to block 708, wherein the method 700 may include locking the charging port 202 to the EV 102 to disallow decoupling of the charging port 202 from the EV 102 by an unauthorized individual to avoid the parking citation.

It should be apparent from the foregoing description that various exemplary embodiments of the application may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the application. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for locking a charging port to charge an electric vehicle, comprising:
   determining that the electric vehicle is located within a predetermined distance of a charging station;
   determining if the charging station issues parking citations associated with parking of the electric vehicle at the charging station without attachment of the charging port to the electric vehicle;
   determining charging of the electric vehicle and sending a command to an electric vehicle supply equipment (EVSE) of the charging station to enable a locking mechanism of the charging port to lock the charging port in place to ensure continued attachment of the charging port to the electric vehicle;
   when it is determined the charging station issues parking citations, completing user authentication with respect to an operator of the electric vehicle to disable the locking mechanism and allow detachment of the charging port from the electric vehicle to ensure that the charging port is not detached by an unauthorized individual and that parking citations are not issued to the operator of the electric vehicle by the charging station; and
   when it is determined the charging station does not issue parking citations, disabling the locking mechanism and allowing detachment of the charging port from the electric vehicle when someone is attempting to remove the charging port and/or a battery of the electric vehicle has reached a full state of charge.

2. The computer-implemented method of claim 1, wherein determining that the electric vehicle is located within the predetermined distance includes determining a current geo-location of the electric vehicle and comparing the current geo-location of the electric vehicle to a plurality of stored geo-locations of a plurality of charging stations, wherein a match between the current geo-location of the electric vehicle and a geo-location of the charging station is determined.

3. The computer-implemented method of claim 1, wherein determining that the charging station issues parking citations includes communicating with a camera system of the electric vehicle to receive image data associated with at least one image of the charging station and analyzing the image data to determine if any signage is captured that indicates that the charging station issues the parking citations.

4. The computer-implemented method of claim 1, wherein determining that the charging station issues parking citations includes querying a citation database that includes a record that is associated with the charging station and analyzing the record to determine if the charging station issues the parking citations.

5. The computer-implemented method of claim 1, wherein sending the command to the EVSE includes determining when the charging port is attached to the electric vehicle to actively charge the electric vehicle based on a communication with a vehicle computing device of the electric vehicle, wherein it is determined if at least one sensor of a charging inlet of the electric vehicle senses attachment of the charging port to the charging inlet to charge a battery of the electric vehicle based on the communication.

6. The computer-implemented method of claim 5, further including prompting, when it is determined the charging station issues parking citations, an individual who is attempting to decouple the charging port from the charging inlet of the electric vehicle to input user credentials that are used to authenticate the individual as the operator of the electric vehicle.

7. The computer-implemented method of claim 6, further including comparing the user credentials inputted by the individual to the user credentials previously inputted by the operator of the electric vehicle to determine if the operator or the unauthorized individual attempts to disconnect the charging port.

8. The computer-implemented method of claim 7, wherein completing user authentication with respect to the operator of the electric vehicle includes using at least one of: user credentials, facial image, payment information, and driver license information to authenticate the operator of the electric vehicle to unlock and detach the charging port from the charging inlet of the electric vehicle.

9. A system for locking a charging port to charge an electric vehicle, comprising:
   a memory storing instructions when executed by a processor cause the processor to:
      determine that the electric vehicle is located within a predetermined distance of a charging station;
      determine if the charging station issues parking citations associated with parking of the electric vehicle at the charging station without attachment of the charging port to the electric vehicle;
      determine charging of the electric vehicle and send a command to an electric vehicle supply equipment (EVSE) of the charging station to enable a locking mechanism of the charging port to lock the charging port in place to ensure continued attachment of the charging port to the electric vehicle;
      when it is determined the charging station issues parking citations, complete user authentication with respect to an operator of the electric vehicle to disable the locking mechanism and allow detachment of the charging port from the electric vehicle to ensure that the charging port is not detached by an unauthorized individual and that parking citations are not issued to the operator of the electric vehicle by the charging station; and
      when it is determined the charging station does not issue parking citations, disabling the locking mechanism and allowing detachment of the charging port from the electric vehicle when someone is attempting to remove the charging port and/or a battery of the electric vehicle has reached a full state of charge.

10. The system of claim 9, wherein determining that the electric vehicle is located within the predetermined distance includes determining a current geo-location of the electric vehicle and comparing the current geo-location of the electric vehicle to a plurality of stored geo-locations of a plurality of charging stations, wherein a match between the current geo-location of the electric vehicle and a geo-location of the charging station is determined.

11. The system of claim 9, wherein determining that the charging station issues parking citations includes communicating with a camera system of the electric vehicle to receive image data associated with at least one image of the charging station and analyzing the image data to determine if any signage is captured that indicates that the charging station issues the parking citations.

12. The system of claim 9, wherein determining that the charging station issues parking citations includes querying a citation database that includes a record that is associated with the charging station and analyzing the record to determine if the charging station issues the parking citations.

13. The system of claim 9, wherein sending the command to the EVSE includes determining when the charging port is attached to the electric vehicle to actively charge the electric vehicle based on a communication with a vehicle computing device of the electric vehicle, wherein it is determined if at least one sensor of a charging inlet of the electric vehicle senses attachment of the charging port to the charging inlet to charge a battery of the electric vehicle based on the communication.

14. The system of claim 13, wherein the instructions cause the processor to prompt, when it is determined the charging station issues parking citations, an individual who is attempting to decouple the charging port from the charging inlet of the electric vehicle to input user credentials that are used to authenticate the individual as the operator of the electric vehicle.

15. The system of claim 14, wherein the instructions cause the processor to compare the user credentials inputted by the individual to the user credentials previously inputted by the operator of the electric vehicle to determine if the operator or the unauthorized individual attempts to disconnect the charging port.

16. The system of claim 15, wherein completing user authentication with respect to the operator of the electric vehicle includes using at least one of: user credentials, facial image, payment information, and driver license information to authenticate the operator of the electric vehicle to unlock and detach the charging port from the charging inlet of the electric vehicle.

17. A non-transitory computer readable storage medium storing instructions that when executed by a computer, which includes a processor perform a method, the method comprising:

determining that an electric vehicle is located within a predetermined distance of a charging station;

determining if the charging station issues parking citations associated with parking of the electric vehicle at the charging station without attachment of a charging port to the electric vehicle;

determining charging of the electric vehicle and sending a command to an electric vehicle supply equipment (EVSE) of the charging station to enable a locking mechanism of the charging port to lock the charging port in place to ensure continued attachment of the charging port to the electric vehicle;

when it is determined the charging station issues parking citations, completing user authentication with respect to an operator of the electric vehicle to disable the locking mechanism and allow detachment of the charging port from the electric vehicle to ensure that the charging port is not detached by an unauthorized individual and that parking citations are not issued to the operator of the electric vehicle by the charging station; and when it is determined the charging station does not issue parking citations, disabling the locking mechanism and allowing detachment of the charging port from the electric vehicle when someone is attempting to remove the charging port and/or a battery of the electric vehicle has reached a full state of charge.

18. The non-transitory computer readable storage medium of claim 17, wherein determining that the charging station issues parking citations includes querying a citation database that includes a record that is associated with the charging station and analyzing the record to determine if the charging station issues the parking citations.

* * * * *